United States Patent [19]
Swanson

[11] 3,800,488
[45] Apr. 2, 1974

[54] DOOR JAMB WITH MITERED JOINTS AND L-SHAPED BRACKETS

[76] Inventor: Clifford D. Swanson, 2107 Wellesly Dr., Lansing, Mich. 48910

[22] Filed: Feb. 16, 1972

[21] Appl. No.: 226,753

[52] U.S. Cl.................. 52/212, 49/505, 52/217, 52/309
[51] Int. Cl............................................. E06b 1/30
[58] Field of Search ............. 52/212, 211, 217, 309; 49/504, 505, 380

[56] References Cited
UNITED STATES PATENTS

| | | | |
|---|---|---|---|
| 3,545,135 | 12/1970 | Lieber | 49/505 |
| 3,401,487 | 9/1968 | Brandt et al. | 52/211 |
| 2,842,236 | 7/1958 | Axelrod | 49/380 |
| 3,654,734 | 4/1972 | Lehman | 52/212 |
| 2,562,105 | 7/1951 | Lang | 52/212 |
| 3,250,041 | 5/1966 | Anger | 52/309 X |
| 2,872,711 | 2/1959 | Killebrew | 52/212 |
| 3,040,390 | 6/1962 | Carlton | 52/211 |
| 2,736,930 | 3/1956 | Longley | 52/217 |

FOREIGN PATENTS OR APPLICATIONS

| | | | |
|---|---|---|---|
| 938,210 | 1/1956 | Germany | 52/212 |
| 1,155,246 | 4/1958 | France | 52/211 |
| 618,100 | 2/1961 | Italy | 49/505 |
| 1,100,763 | 9/1955 | France | 49/504 |
| 1,073,661 | 6/1967 | Great Britain | 49/505 |

Primary Examiner—Frank L. Abbott
Assistant Examiner—Leslie A. Braun
Attorney, Agent, or Firm—Whittemore, Hulbert & Belknap

[57] ABSTRACT

Building structure for finishing a building opening in a wall including a pair of foamed synthetic resin elongated members having a generally L-shaped cross section including first portions adapted to extend in the planes of the opposite side surfaces of the wall, which first portions converge slightly toward each other in assembly to facilitate tight securing of the elongated members at the edge of the building opening, said elongated members cross sections further including second portions extending toward each other through the building opening at the edge thereof, one of which includes a third portion forming a longitudinal slot for receiving the end of the second portion of the cross section of the other of the elongated members whereby the building structure may be installed in walls having different thickness, said third portion of the one elongated member cooperating with offsets in the first portions of the elongated members to space the second portions of the elongated members from the frame of the wall opening at the edge of the opening. Mitered joints are provided between pairs of such elongated members including an L-shaped bracket extending into the slots at the mitered joints for securing the mitered joints together, which L-shaped brackets have Ridges on the ends thereof extending into grooves within the slots in the third portion of the one elongated members at the mitered joints and notches in the other elongated members at the mitered joints for accommodating the L-shaped brackets.

3 Claims, 5 Drawing Figures

PATENTED APR 2 1974 3,800,488

3,800,488

DOOR JAMB WITH MITERED JOINTS AND L-SHAPED BRACKETS

BACKGROUND OF THE INVENTION

1. Field of the Invention

The invention relates to building structures and refers more specifically to foamed synthetic resin members for finishing door openings and the like in building walls having different thickness, which members fit snugly about the periphery of the openings in which they are installed and are firmly supported at the edge of the opening in the wall between the wall surfaces. The building structure of the invention is particularly suited to be constructed with mitered corners.

2. Description of the Prior Art

In the past, finishing of door openings and the like in the walls of the buildings has generally been accomplished by a plurality of separate wood members built up of an interior trim member, an exterior trim member, a member extending between the interior and exterior trim members through the opening to which doors are hinged and latched and a door stop member. Such construction is expensive and will probably become more expensive as wood becomes a more scarce commodity and labor becomes more expensive.

Wherein extruded metal and the like have been used for building opening finishing members, the finishing members have generally been of a single piece and therefore capable of finishing only openings in walls having specified thickness. Further, the extrusions of the past have not always lent themselves readily to mitered corner construction. In addition, metal extrusions and the like do not provide the same appearance of luxury construction as wood-finished openings provide and are therefore unacceptable in much construction.

SUMMARY OF THE INVENTION

In accordance with the present invention, building structure is provided to finish a building opening including a pair of elongated members adapted to be positioned around the periphery of the opening to be finished, each of which have generally L-shaped cross sections and include first portions extending in the plane of the opposite surfaces of the wall in which the building opening is positioned and portions extending toward each other between the opposite surfaces of the wall at the edges of the opening. One of the elongated members includes a third portion having a generally U-shaped cross section at the end of the second portion thereof adapted to receive the end of the second portion of the other of the elongated members, one leg of which spaces the second portions of the elongated members from the frame of the building opening centrally of the opening. The other leg of the U-shaped portion of the one elongated member may serve as a door stop when the members are used to finish a door opening. Offsets are provided in the surface of the first portions of the elongated members extending along the opposite surfaces of the wall which are spaced from the first portions the same distance as the thickness of the one leg of the U-shaped cross section third portion of the first of the elongated members so that the elongated members are provided with three-point spacing from the frame of the opening.

The elongated members are mitered at joints in accordance with the invention and are secured together at the mitered joints by an L-shaped bracket having ridges at the ends thereof adapted to extend within grooves in the slots in the third portion of the one elongated member. The other elongated members are provided with notches in the end of the second portions thereof adjacent the mitered joints for accommodating the L-shaped brackets.

DESCRIPTION OF THE PREFERRED EMBODIMENT

Figure 1:
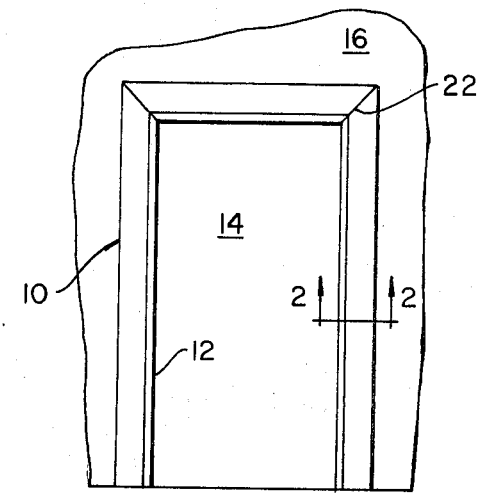
FIG. 1 is an elevation view of a door opening in a building wall which has been finished with the building structure of the invention.

As shown in FIG. 1, the building structure 10 of the invention is secured about the periphery 12 of a door opening 14 in a building wall 16. The building structure 12 includes a pair of elongated members 18 and 20 at each side of the door opening 14 and at the head of the door opening which are joined at the corners in mitered joints 22.

Figure 2:
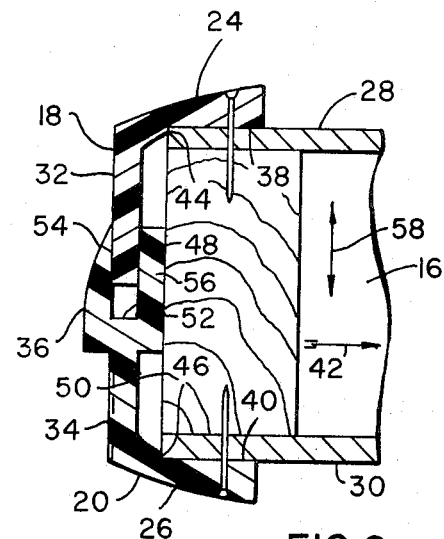
FIG. 2 is an enlarged cross section of the building structure of the invention taken substantially on the line 2—2 in FIG. 1.
Figure 3:
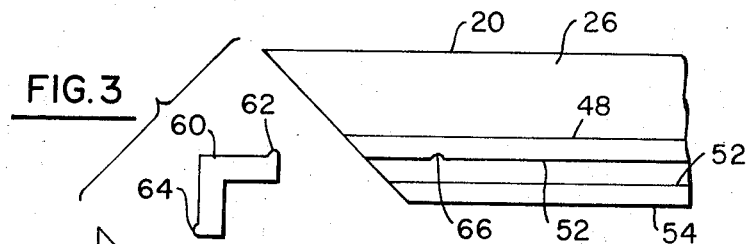
FIG. 3 is an exploded view of part of a mitered corner joint of building structure constructed in accordance with the invention as illustrated in FIGS. 1 and 2.
Figure 4:
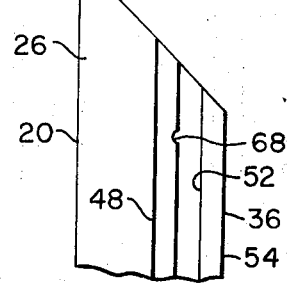
FIG. 4 is a section view of one of the elongated members of the building structure of the invention taken in the direction of arrow 4 in FIG. 3, showing the L-shaped bracket of FIG. 3 in assembly with the one of the elongated members.

The elongated members 18 and 20 shown in cross section in FIG. 2 each include a first portion 24 and 26 extending generally parallel to the surfaces 28 and 30 of the wall 16 and second portions 32 and 34 integral with the first portions and extending substantially perpendicularly thereto and toward each other through the opening 14.

The one elongated member 20 includes a third portion 36 depending from the free end of the portion 34 of the cross section thereof for receiving the free end of the second portion 32 of the other elongated member 18, as shown best in FIG. 2, whereby the members 18 and 20 may be used to finish openings in walls 16 having different thickness.

The first portions 24 and 26 of the elongated members 18 and 20 have surfaces 38 and 40 which converge toward each other outwardly of the door opening 14. That is to say, the surfaces 38 and 40 converge in the direction of arrow 42 in FIG. 2 so that on installation of the members 18 and 20 with the end of the portion 32 of the cross section of the member 18 received within the portion 36 of the member 20, the members 18 and 20 may be installed on the wall 14 with the portions 24 and 26 in firm engagement with the wall surfaces 28 and 30.

The members 24 and 26 are further provided with offsets 44 and 46 in the surfaces 38 and 40 thereof which are spaced from the portions 32 and 34 of the members 18 and 20 the same distance as the thickness of the leg 48 of the portion 36 of the member 20. The offsets 44 and 46 provide abutments for spacing the second portions 32 and 34 of the members 18 and 20 from the frame 50 of the opening 14. Thus, together with the leg 48 of the portion 36 of the member 20, the members 18 and 20 in installation are spaced from the frame 50 in three locations over the cross section of the installed building structure.

As shown best in FIG. 2, the portion 36 of the member 20 is provided with a U-shaped cross section providing a slot 52 between the legs 54 and 48. The leg 54 provides a door stop against which a door hinged and latched on the member 20 may be closed. The leg 48 provides spacing between the portions 32 and 34 of the members 18 and 20 and the frame 50 as indicated above.

With the end 56 of the portion 32 of the cross section of the member 18 received in the slot 52, it will be seen that the members 18 and 20 may be moved relative to each other in the direction of arrows 58 without harming the external appearance of the building structure 10. The finishing of openings in walls having different thickness is thus facilitated.

The mitered corners 22 are effected in the building structure 10 with the aid of an L-shaped bracket 60 including ridges 62 and 64 at the opposite ends thereof. The ridges 62 and 64 fit within grooves 66 and 68, respectively, in the slots 52 in the members 20 at the mitered joints. The brackets 60 are positioned in the slots 52 with the members 20 assembled in the mitered joint by sliding the L-shaped brackets 60 into the slots 52 at the corners with ridges 62 and 64 in grooves 66 and 68.

Figure 5:
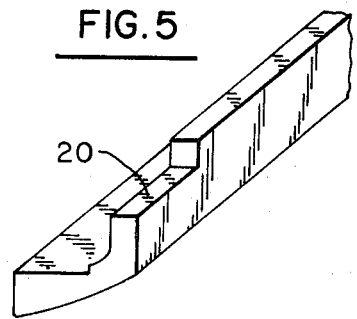
FIG. 5 is a perspective view of the other of the elongated members of the building structure illustrated in FIG. 3, showing the notch in the end thereof for accommodating the L-shaped bracket of the building structure in assembly as shown in FIG. 4.

The mitered joint construction is completed on assembly of the mitered members 18. As shown in FIG. 5, the members 18 include notches 70 at the ends thereof adjacent the mitered corners for accommodating the L-shaped brackets in the miter joints.

Each of the elongated members 18 and 20 are constructed of foamed synthetic resin in a mold whereby the members 18 and 20 have a homogeneous surface which has the characteristics of wood. Members 18 and 20 are formed by equipment such as that disclosed in the above referenced related patent application by the methods disclosed therein. Consequently, the building structure 10 is suitable for normal finishing such as painting and gives the warm, aesthetic appearance of wood.

While one embodiment of the invention has been considered in detail, it will be understood that other embodiments and modifications of the building structure disclosed are contemplated. It is the intention to include all such embodiments and modifications as are defined by the appended claims within the scope of the invention.

What I claim as my invention is:

1. Building structure for finishing a door opening in a wall or the like comprising a pair of elongated members at each side and at the head of a door opening, each of said pair of elongated members having a generally L-shaped cross section including first portions adapted to extend along the surface of the wall at the door opening therein which converge slightly toward each other outwardly of the door opening whereby on installation at the edge of the opening in the wall the first portions of the elongated members will fit snugly against the wall, each of said elongated members including second cross section portions adapted to extend toward each other at the edge of the opening in the wall, one of said L-shaped members including a U-shaped third cross section portion at the end of the second portion thereof receiving the end of the second portion of the cross section of the other L-shaped member including an outer leg which is offset inwardly of the opening of the wall to form a stop and an inner leg which is offset outwardly of the door opening and spaces the second portions of the elongated members from the building opening, each of the first portions of the cross section of the elongated members also including offsets therein to provide an abutment for spacing the second portions of the cross section of the elongated members from the frame of the opening in the wall which offsets are located from the second portions of the cross section of the elongated members the same distance as the thickness of the inner leg of the U-shaped third portion of the one elongated member so that the elongated members are spaced from the frame of the opening at three points, and means for mitering the corners of the building structure at the intersection between the pairs of elongated members at the sides and head of the opening comprising an L-shaped bracket adapted to fit within the U-shaped cross section of the third portion of the adjacent one elongated members at the mitered corners.

2. Structure as set forth in claim 1 wherein the means for mitering the corners of the building structure at the intersection between the pairs of elongated members further includes grooves extending into the U-shaped third portion of the cross section of the first elongated members from the open edge thereof adjacent to but spaced from the corners and further including ridges on the free ends of the L-shaped bracket for holding the bracket within the U-shaped cross section portion on insertion of the L-shaped bracket into the U-shaped cross section portion from the open edge of the U-shaped cross section portion.

3. Structure as set forth in claim 2 wherein the mitering means further includes a notch in the end of the other of said elongated members adjacent the mitered corners of the building structure to provide room for the L-shaped bracket in the U-shaped cross section third portion of the one elongated member and to hold the L-shaped bracket in assembly in the one L-shaped member.

* * * * *